W. H. YOUNG.
NUT-LOCK.
No. 185,008.  Patented Dec. 5, 1876.
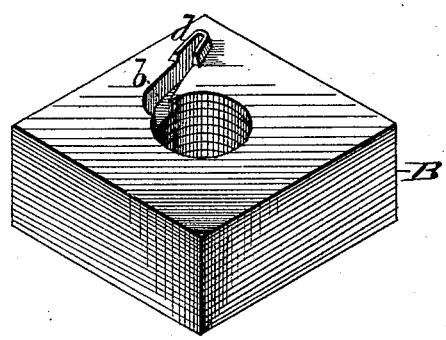
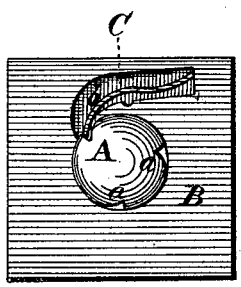
WITNESSES
Franck L. Durand
C. L. Evert.
INVENTOR
Wm H. Young
By Alexander Mason
Attorneys

UNITED STATES PATENT OFFICE.

WILLIAM H. YOUNG, OF TROY, NEW YORK.

IMPROVEMENT IN NUT-LOCKS.

Specification forming part of Letters Patent No. 185,008, dated December 5, 1876; application filed January 24, 1876.

*To all whom it may concern:*

Be it known that I, WILLIAM H. YOUNG, of Troy, in the county of Rensselaer and State of New York, have invented certain new and useful Improvements in Nut-Locks; and I do hereby declare the following to be a full, clear, and exact description thereof, reference being had to the accompanying drawing, and to the letters of reference marked thereon.

My invention relates to that class of nut-locks in which a ratchet-spring or spring-pawl is embedded in the nut and takes into grooves on the bolt; and the nature of my invention consists in the construction of the nut with a recess and projecting spur or spurs, whereby the spring-pawl, when placed in said recess, will be held firmly and permanently in place by hammering down the spur, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a perspective view of the nut before the pawl is inserted. Fig. 2 is a plan view of the same after the pawl is fastened therein and the nut placed on the bolt.

A represents the bolt, having longitudinal grooves *a a;* and B is the nut, with spring-pawl C fastened therein, to engage in the grooves *a* and prevent the nut from coming loose. The nut B is pressed in the usual manner, and has a recess, *b*, formed in it, which recess extends from the bolt-hole on a curve or otherwise to near the edge of the nut; or it may run through said edge, if desired. On the face of the nut, at the side of the recess *b*, are formed one or more spurs, *d*, as shown in Fig. 1.

When the spring-pawl C is placed in the recess it is fastened therein by simply hammering down the spur or spurs *d*, thereby holding it permanently in its place.

The recess *b* and spurs *d* are formed in the act of pressing the nut; or the nut may be cast of malleable iron, with such recess and spurs. Hence, there is no additional labor or expense in the manufacture; and the mode of fastening is simple, can be done in an instant, and when the pawl is thus fastened it is not liable to come out.

The spurs *d* may be of any height desired. They need only be very slightly raised above the face of the nut, and in some cases they may be formed within the recess. If the recess is run close to the edge of the nut the spring-pawl may be fastened by hammering the side of the nut, the pawl being in all cases held by the metal of the nut alone, without any additional devices or soldering of any kind.

I do not broadly claim a spring or springs secured in a recess by molten alloys poured into the recess, as I am aware that such is not new.

Having thus fully described my invention, what I claim as new, and desire to secure by Letters Patent, is—

1. The combination of the nut B, having the recess *b*, and the spring-pawl C placed in said recess, the pawl being held firmly therein by the metal of the nut alone, said metal being compressed against the spring, substantially as herein set forth.

2. The nut B, formed with the recess *b* and one or more spurs, *d*, substantially as described, for fastening the spring-pawl C in the recess by hammering down the spurs, as set forth.

WILLIAM H. YOUNG.

Witnesses:
LUCIEN BIRDSALL,
JAMES W. PALMER.